US012640771B2

(12) United States Patent
Park et al.

(10) Patent No.: US 12,640,771 B2
(45) Date of Patent: May 26, 2026

(54) COMPACT RF FRONT-END MODULE AND METHOD OF PACKAGING

(71) Applicant: Avago Technologies International Sales Pte. Limited, Singapore (SG)

(72) Inventors: ByungJoon Park, Gyeonggi-do (KR); Hyung-Bin Lee, Seoul (KR)

(73) Assignee: Avago Technologies International Sales Pte. Limited, Singapore (SG)

( * ) Notice: Subject to any disclaimer, the term of this patent is extended or adjusted under 35 U.S.C. 154(b) by 289 days.

(21) Appl. No.: 18/480,805

(22) Filed: Oct. 4, 2023

(65) Prior Publication Data

US 2025/0119175 A1     Apr. 10, 2025

(51) Int. Cl.
*H04B 1/58*          (2006.01)
(52) U.S. Cl.
CPC ............. *H04B 1/581* (2013.01); *H04B 1/586* (2013.01)
(58) Field of Classification Search
CPC ......... H04B 1/581; H04B 1/586; H03F 3/211; H03F 3/213; H03F 2200/451; H03F 2200/534; H03F 2200/541; H01F 17/0013; H01L 23/49822
See application file for complete search history.

(56) References Cited

U.S. PATENT DOCUMENTS

| | | | |
|---|---|---|---|
| 9,349,708 B2 | 5/2016 | Fu et al. | |
| 9,693,461 B2 | 6/2017 | Zhao et al. | |
| 11,380,979 B2 | 7/2022 | Dalmia et al. | |
| 12,327,805 B2 * | 6/2025 | Kim | H01L 23/66 |
| 2002/0074146 A1 * | 6/2002 | Okubora | H01L 23/36 257/E23.101 |
| 2004/0014428 A1 | 1/2004 | Franca-Neto | |
| 2011/0079917 A1 | 4/2011 | Xia et al. | |
| 2012/0293265 A1 * | 11/2012 | Heikkinen | H03F 1/565 330/307 |
| 2014/0002187 A1 * | 1/2014 | McPartlin | H10D 62/10 257/E29.174 |
| 2020/0052663 A1 * | 2/2020 | Koya | H01F 27/2804 |
| 2020/0203291 A1 * | 6/2020 | Uejima | H01L 23/66 |
| 2020/0321916 A1 * | 10/2020 | Zheng | H03F 3/195 |
| 2021/0036685 A1 * | 2/2021 | Kamgaing | H03H 9/0547 |

\* cited by examiner

*Primary Examiner* — Un C Cho

(74) *Attorney, Agent, or Firm* — Quarles & Brady LLP

(57)          ABSTRACT

A front-end module in compact printed circuit board (PCB) package. The module comprises a PCB comprising a top surface, the top surface comprising a first portion. The module also comprises a power amplifier block disposed on the PCB, the power amplifier block comprising a power amplifier and an output-matching network (OMN) transformer. The power amplifier is coupled to the first portion of the top surface. The OMN transformer is positioned in the PCB vertically under the power amplifier at a first level below the top surface. The module is provided in a compact package with the power amplifier block in the first portion and other functional blocks comprising a filter block, a switch block, a control block, and a low-noise amplifier block, and being disposed on a remaining area of the PCB, outside of the first portion.

20 Claims, 7 Drawing Sheets

(Existing Art)

(Existing Art)

Top View

Cross-Section View

COMPACT RF FRONT-END MODULE AND METHOD OF PACKAGING

FIELD OF INVENTION

The subject technology is directed to compact module packages and methods of packaging.

BACKGROUND OF THE INVENTION

The demand for more compact module packaging continues to increase. For example, a smaller form-factor of various functional blocks or dies is consistently desirable to achieve a smaller size for final system product. This invention introduces a method to significantly reduce the size of the Radio Frequency Front End Module (RF FEM).

In typical existing RF FEM, multiple functional blocks are included, such as multiband power amplifiers (PA), film bulk acoustic resonators (FBAR) duplexers and multiplexers, silicon-on-insulator (SOI) multimode low noise amplifiers (LNAs), antenna switches, couplers, and a mobile industry processor interface (MIPI) controller. These blocks are all designed to support various carrier aggregations (CA) for both Frequency Division Duplexing (FDD) and Time Division Duplexing (TDD) bands. Efforts have been made to optimize the size of each block, reaching a limit beyond which any further reduction could lead to performance degradation. Advanced packaging methods like system-in-package (SIP) and system-on-package (SOP) have facilitated module size minimization. However, reducing the area of the PA and its output matching network (OMN) has proven to be a challenging task, due to their requirements for high output power and linearity. Therefore, improved methods of packaging the PA and associated OMN to reduce the size of a compact RF FEM are desired.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

The subject technology is directed to compact module packages and methods of packaging. In a specific embodiment, a front-end module in compact printed circuit board (PCB) package is provided. The module comprises a power amplifier block disposed on the PCB comprising a power amplifier and an output-matching network (OMN) transformer. The power amplifier is coupled to the first portion of PCB. The OMN transformer is positioned in the PCB vertically under the power amplifier. The compact package also comprises other functional blocks including a filter block, a switch block, a control block, and a low-noise amplifier block, which are disposed on a remaining area of the PCB, outside of the first portion. There are other embodiments as well.

Figure 1:
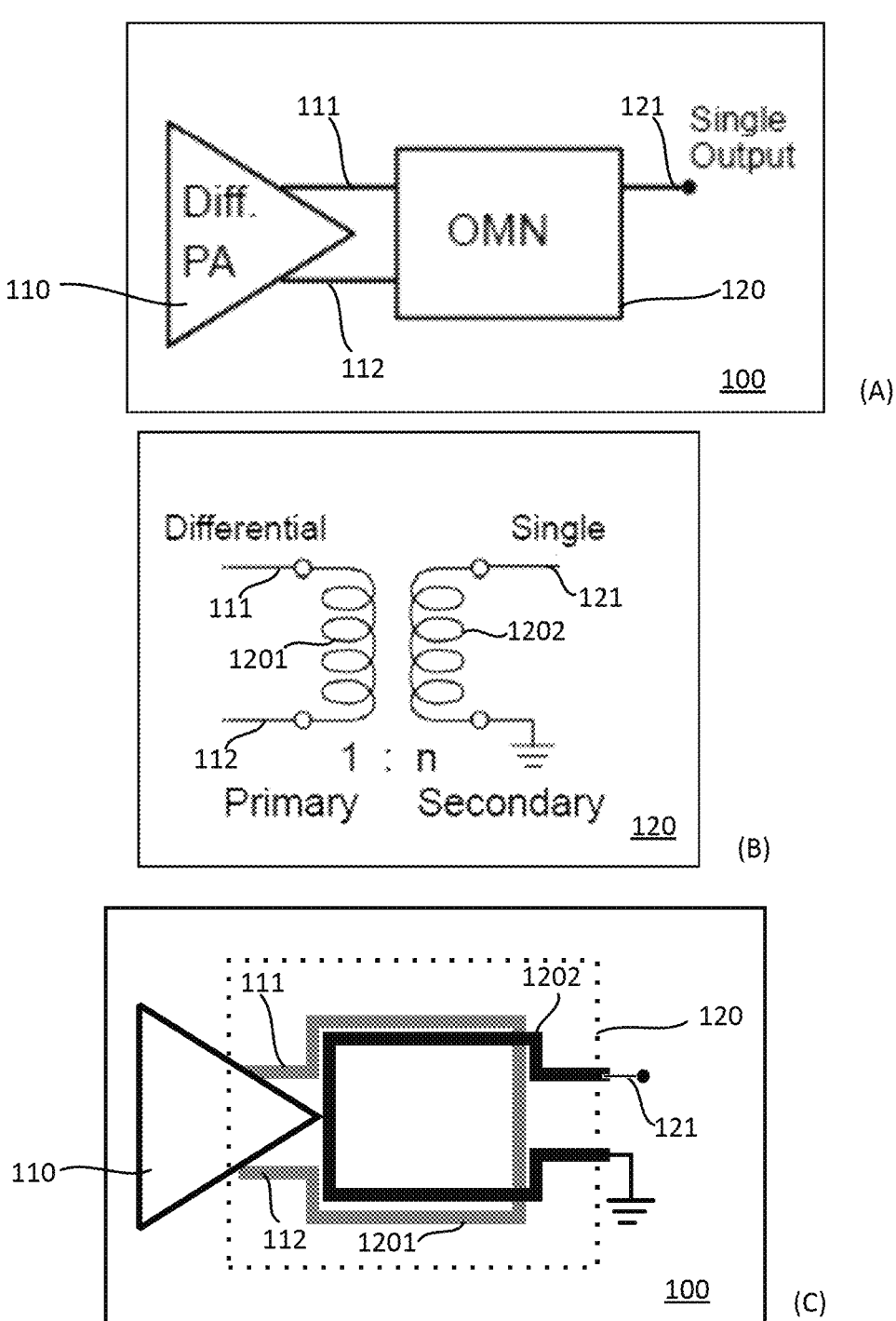
FIG. 1 is (A) a schematic diagram of a power amplifier (PA) module having an associated output matching network (OMN), (B) an OMN based on differential-to-single transformer, (C) a layout example of a differential-to-single transformer.

For most commercial power amplifiers, it generally employs differential structure to improve efficiency while generating higher output power. When using differential structure, a differential-to-single transformer-based output matching network (OMN) is needed. FIG. 1 is (A) a schematic diagram of a power amplifier (PA) module having an associated output matching network (OMN), (B) an OMN based on differential-to-single transformer, (C) a layout example of a differential-to-single transformer. In FIG. 1 part (A), a power amplifier block includes a differential power amplifier 110 having a pair of output ports 111 and 112 to provide a differential voltage output. The PA block also includes an OMN 120 coupled to the pair of output ports 111 and 112 to receive the differential voltage output and convert to a single voltage output at the output port 121. FIG. 1 part (B) shows an example of the OMN 120 which is a differential-to-single transformer having a first (primary) winding 1201 and a second (secondary) winding 1202. The two terminals of the first winding 1201 are respectively coupled with the pair of output ports 111 and 112 (of the PA 110). Terminal 121 of two terminals of the second winding 1202 is used as the single output terminal while another of the two terminals is grounded. Depending on the ratio of winding numbers (turns) of the first winding 1201 and the second winding 1202, e.g., 1:n, a voltage transform ratio of the OMN transformer 120 also changes.

For the purpose of making a compact module, one way is to integrate the OMN 120 on the die of PA 110, but that packaging structure produces higher loss of the OMN. For achieving wider bandwidth and lower insertion loss of the OMN, transformer designed with printed circuit board (PCB) is widely used. Unlike traditional transformer, the PCB transformer is made by two windings of conductive traces that are built as part of the PCB itself. The PCB substrate is typically made of a dielectric material like FR4, which is a common material used in standard PCBs. The windings are formed by laying out conductive traces on a same layer or on different layers of a multi-layer PCB, depending on the design and isolation requirements. One of the windings acts as the primary, which is connected to input voltage. The second winding acts as the secondary, where the transformed voltage is taken out. For optimal transformer operation, the primary and secondary windings should be closely coupled. If the traces are on the same layer, they can be laid out in a spiral or other configuration to ensure close proximity and good coupling. If on different layers, they can be stacked on top of each other with vias connecting them, if needed. Using multiple layers can also help in achieving more turns in a limited space. FIG. 1 part (C) gives a specific example of a layout of the OMN PCB transformer 120. In this example, the first and second windings are formed as two bunches of conductive traces 1201 and 1202 being laid with a looped geometry shape from one terminal to another. The conductive traces 1201 and 1202, for example, can be laid in a PCB. Both bunches can be overlapped at the same area of the PCB but with different depth in the PCB such that they are electrically coupled with each other. One bunch of conductive traces 1201 can be laid in opposite orientation to the other bunch of conductive traces 1202 in terms of the locations of their terminals. For example, two terminals of the first winding 1201 are located at left side to couple with the two output ports 111 and 112 of the power amplifier 110, and two terminals of the second winding 1202 are located at right side, one terminal 121 yields a single output as another terminal being grounded.

Figure 2:
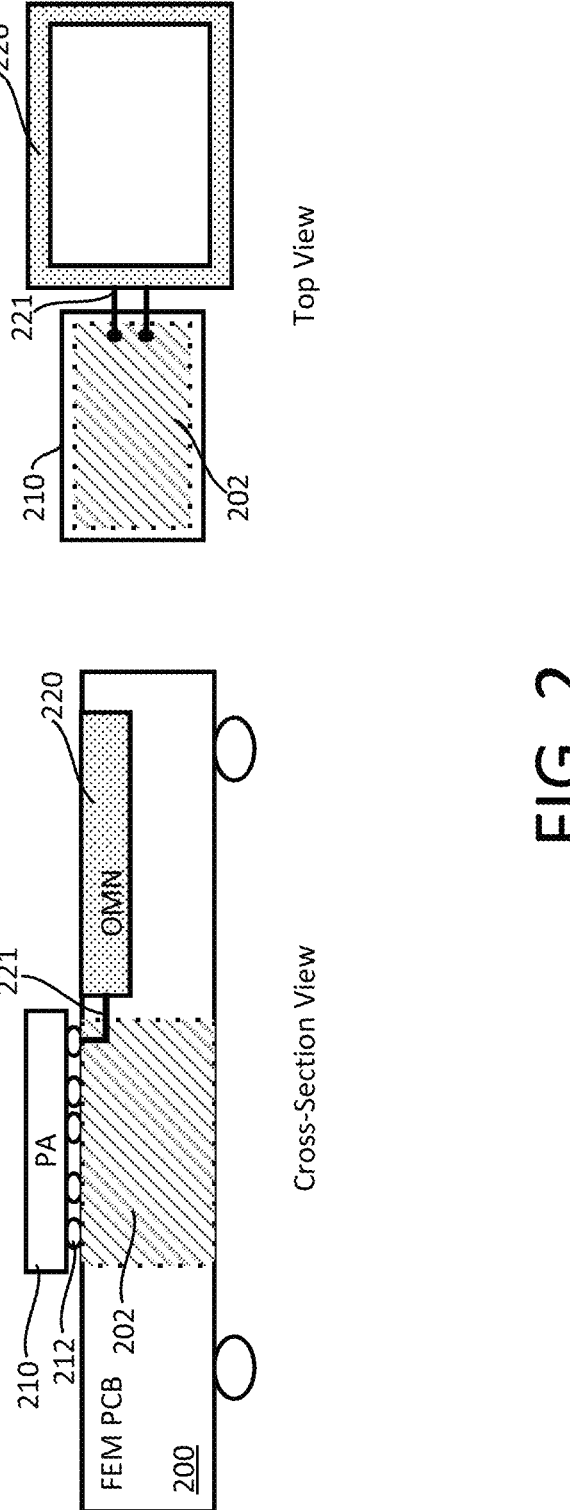
FIG. 2 is a schematic diagram of a conventional power amplifier (PA) and a printed circuit board (PCB) transformer allocation in a PCB of a front-end module.

But the PCB transformer itself, as shown in FIG. 1(C), takes a certain size of the PCB space which may be equivalent to the size of the power amplifier module. Especially for some commercial radio-frequency front-end modules (RF FEMs) in wireless communication systems, multiple PA blocks are used to cover various bands and each PA needs its own OMN. This results in a bulky size for the existing FEM module package with the PCB transformers. FIG. 2 is a schematic diagram of a conventional power amplifier (PA) 210 and a PCB transformer allocation in a PCB 200 of a front-end module (FEM). As shown in the cross-section view, a power amplifier (PA) module 210 associated with a front-end module is mounted on a designated portion of the top surface of the PCB 200 via multiple surface contacts 212. Under the PA module 210, a region 202 in the PCB 200 corresponding to direct vertical projection from the PA 210 is allocated to construct all grounding (GND), Input/Output (IO), and control lines for controlling and operating the PA as well as allowing the PA to communicate with other functional blocks also mounted on the FEM. An output matching network (OMN) transformer 220, which is required for a PA configured to handle differential signals, is formed adjacent to the PA 210. Specifically, as shown in the cross-section view, the OMN transformer 220 is positioned in the top surface of the PCB 200 and takes a similar lateral dimension of the PA 210. The OMN transformer 220 is coupled to the PA 210 via an interconnect 221 positioned in the PCB 200 and at least one surface contact 212. Theoretically, there is a way to integrate the OMN on the PA module, but that introduces much higher loss of the OMN is a huge trade-off to get a reduction in package size. While as seen in the top view, the OMN transformer 220 is primarily configured as a closed loop in circle or rectangular shape leaving a null space, i.e., unused PCB portion, within the loop including the region underneath thereof. If this null space can be properly used, a relatively compact PA block package can be realized.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the subject technology is not intended to be limited to the embodiments presented, but is to be accorded the widest scope consistent with the principles and novel features disclosed herein.

In the following detailed description, numerous specific details are set forth in order to provide a more thorough understanding of the subject technology. However, it will be apparent to one skilled in the art that the subject technology may be practiced without necessarily being limited to these specific details. In other instances, well-known structures and devices are shown in block diagram form, rather than in detail, in order to avoid obscuring the subject technology.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

In the following detailed description, "printed circuit board" or PCB is referred to a non-conductive substrate that serves as the physical platform for arranging electronic components and provides the means to electrically interconnect these components in a systematic and organized manner. PCB usually is made of materials such as fiberglass, composite epoxy, or other similar materials, that carries conductive tracks or traces etched from copper sheets laminated onto its surface. These traces form the 'wiring' and connections between different electronic components. Components such as transistors, resistors, capacitors, inductors, connectors, and Integrated Circuits (ICs) made by those components are mounted onto the PCB and are interconnected through these conductive traces according to the circuit design. The components can be affixed to the PCB using various methods, such as through-hole technology (components are inserted into holes) or surface-mount technology (components are placed directly on top of the PCB via contact pads). PCBs can be single-layer (one conductive layer), double-layer (two conductive layers, one on each side of the substrate), or multi-layer (more than two layers to accommodate complex circuitry, with conductive paths or 'vias' going through the layers). Apart from serving as a stable and organized platform for electronic components, a PCB also provides the physical support, facilitates electromagnetic compatibility (EMC) through careful routing and shielding, assists in heat dissipation, and improves reliability and durability of the final electronic product.

When an element is referred to herein as being "connected" or "coupled" to another element, it is to be understood that the elements can be directly connected to the other element, or have intervening elements present between the elements. In contrast, when an element is referred to as being "directly connected" or "directly coupled" to another element, it should be understood that no intervening elements are present in the "direct" connection between the elements. However, the existence of a direct connection does not exclude other connections, in which intervening elements may be present.

When an element is referred to herein as being "disposed" in some manner relative to another element (e.g., disposed on, disposed between, disposed under, disposed adjacent to, or disposed in some other relative manner), it is to be understood that the elements can be directly disposed relative to the other element (e.g., disposed directly on another element), or have intervening elements present between the elements. In contrast, when an element is referred to as being "disposed directly" relative to another element, it should be understood that no intervening elements are present in the "direct" example. However, the existence of a direct disposition does not exclude other examples in which intervening elements may be present.

Similarly, when an element is referred to herein as being "bonded" to another element, it is to be understood that the elements can be directly bonded to the other element (without any intervening elements) or have intervening elements present between the bonded elements. In contrast, when an element is referred to as being "directly bonded" to another element, it should be understood that no intervening elements are present in the "direct" bond between the elements. However, the existence of direct bonding does not exclude other forms of bonding, in which intervening elements may be present.

Likewise, when an element is referred to herein as being a "layer," it is to be understood that the layer can be a single layer or include multiple layers. For example, a conductive layer may comprise multiple different conductive materials or multiple layers of different conductive materials, and a dielectric layer may comprise multiple dielectric materials or multiple layers of dielectric materials. When a layer is described as being coupled or connected to another layer, it is to be understood that the coupled or connected layers may include intervening elements present between the coupled or connected layers. In contrast, when a layer is referred to as being "directly" connected or coupled to another layer, it should be understood that no intervening elements are present between the layers. However, the existence of directly coupled or connected layers does not exclude other connections in which intervening elements may be present.

Moreover, the terms left, right, front, back, top, bottom, forward, reverse, clockwise and counterclockwise are used for purposes of explanation only and are not limited to any fixed direction or orientation. Rather, they are used merely to indicate relative locations and/or directions between various parts of an object and/or components.

Furthermore, the methods and processes described herein may be described in a particular order for ease of description. However, it should be understood that, unless the context dictates otherwise, intervening processes may take place before and/or after any portion of the described process, and further various procedures may be reordered, added, and/or omitted in accordance with various embodiments.

Unless otherwise indicated, all numbers used herein to express quantities, dimensions, and so forth should be understood as being modified in all instances by the term "about." In this application, the use of the singular includes the plural unless specifically stated otherwise, and use of the terms "and" and "or" means "and/or" unless otherwise indicated. Moreover, the use of the terms "including" and "having," as well as other forms, such as "includes," "included," "has," "have," and "had," should be considered non-exclusive. Also, terms such as "element" or "component" encompass both elements and components comprising one unit and elements and components that comprise more than one unit, unless specifically stated otherwise.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

One general aspect includes an integrated circuit device in a compact package. The integrated circuit device includes a substrate comprising a top surface. The substrate may be a printed circuit board (PCB). The top surface includes a first portion, a second portion at least partially surrounding periphery of the first portion, and remaining portion outside the first portion and the second portion. The substrate includes at least two windings of conductive traces positioned at a level below the second portion. The integrated circuit device also includes a first circuit disposed on the first portion, the first circuit comprising at least an amplifier. The integrated circuit device further includes a second circuit comprising a transformer based on the two windings of conductive traces, the transformer being coupled to the amplifier. The integrated circuit device may include a third circuit disposed on the remaining portion of the substrate. The third circuit may include a filter, a switch, a control and interface, and a low-noise amplifier.

Implementations may include one or more of the following features. The integrated circuit device where the first portion includes a plurality of contact pads coupled to the amplifier, the plurality of contact pads including at least a pair of output pads, an input pad, multiple grounding pads, and multiple control pads. The integrated circuit device where the transformer based on the two windings includes a first winding and a second winding, the first winding comprising a first pair of terminals coupled to the pair of output pads to receive a differential voltage output from the amplifier, the second winding comprising a ground terminal and an output terminal configured to provide a single voltage output. The first circuit includes a power amplifier duplexer coupled to the second circuit and the third circuit to separate a transmit signal based on the single voltage output from the transformer and a receive signal based on an output from the third circuit. The first winding and the second winding are overlapped with each other. The level below the second portion varies between zero and a thickness of the substrate. The substrate may include a grounding plane positioned between the first portion of the top surface and the two windings of conductive traces. In an embodiment, the amplifier module is a power amplifier. The transformer is a PCB-based output matching network transformer. The integrated circuit device may be a radio-frequency front-end module (RF FEM) for wireless mobile communication. The integrated circuit device may be employed in the handheld devices in 5G and beyond (such as 6G) systems that require compact module form factors.

Another general aspect includes an integrated circuit device in compact package for wireless communication systems. The integrated circuit device includes a substrate comprising a top surface, the top surface comprising a first portion, a second portion, a third portion, and a fourth portion. The second portion at least partially surrounds the periphery of the first portion. The fourth portion at least partially surrounds the periphery of the third portion. The second portion is adjacent to the fourth portion. The substrate may include a first pair of windings of conductive traces positioned at a first level below the fourth portion and a second pair of windings of conductive traces positioned at a second level below the second portion. The integrated circuit also includes a first amplifier coupled onto the first portion. The integrated circuit device may include a second amplifier coupled onto the third portion. The integrated circuit device also includes a first transformer based on the first pair of windings and the first transformer is coupled to the first amplifier. The integrated circuit also includes a second transformer based on the second pair of windings and the second transformer is coupled to the second amplifier.

Implementations may include one or more of the following features. The integrated circuit device where the first portion includes at least a first pair of output pads configured to couple to the first amplifier. The first transformer based on the first pair of windings includes a first winding and a second winding. The first winding is overlapped with the second winding. The first winding includes a first pair of terminals configured to couple to the first pair of output pads to receive a first differential voltage output from the first amplifier, the second winding comprising a first grounded terminal and a first output terminal configured to provide a first single voltage output. The third portion includes at least a second pair of output pads configured to couple to the second amplifier. The second transformer based on the second pair of windings includes a third winding and a fourth winding. The third winding is overlapped with the fourth winding. The third winding includes a second pair of terminals configured to couple to the second pair of output pads to receive a second differential voltage output from the second amplifier. The fourth winding includes a second grounded terminal and a second output terminal configured to provide a second single voltage output. The first level below the second portion varies between zero and a thickness of the substrate. The substrate may include a first grounded plane positioned vertically between the top surface and the first transformer, the first grounded plane being extended laterally across both the third portion and the fourth portion. The second level below the fourth portion varies between zero and a thickness of the substrate. The substrate includes a second grounded plane positioned vertically between the top surface and the second transformer, the second grounded plane being extended laterally across both the first portion and the second portion. The first amplifier and the second amplifier are respectively power amplifiers associated with a front-end module for two different radio frequency bands of the wireless communication system.

Yet another general aspect includes a method for processing an integrated circuit device. The method also includes providing a substrate comprising a top surface and a thickness, the top surface comprising a least a first portion and a second portion, the second portion being adjacent to the first portion. The method also includes laying out a first winding of conductive traces and a second winding conductive traces in the substrate at a first level below the second portion of the top surface, the first winding of conductive traces being overlapped with the second winding of conductive traces. The method may include laying out a third winding of conductive traces and a fourth winding conductive traces in the substrate at a second level below the first portion of the top surface, the third winding of conductive traces being overlapped with the fourth winding of conductive traces. The method also includes forming multiple first contact pads on the first portion of the top surface, the multiple first contact pads comprising at least a first pair of output pads coupled to the first winding. The method also includes forming multiple second contact pads on the second portion of the top surface, the multiple second contact pads comprising at least a second pair of output pads coupled to the third winding. The method further includes disposing a first amplifier onto the first portion of the top surface, the first pair of output pads being coupled to a first differential output from the first amplifier. The method further includes disposing a second amplifier onto the second portion of the top surface, the second pair of output pads being coupled to a second differential output from the second amplifier. The method also includes disposing other functional blocks onto remaining portion of the top surface other than the first portion and the second portion, the other functional blocks may include a filter block, a switch block, a control and interface block, and a low-noise amplifier block.

Implementations may include one or more of the following features. The method may include forming a first transformer based on the first winding of conductive traces and the second winding conductive traces in an at-least-partially-looped shape bearing a periphery of the second portion. The first winding comprises a first pair of input terminals being coupled to the first pair of output pads on the first portion. The method also includes forming a second transformer based on the third winding and the fourth winding in an at-least-partially-looped looped shape bearing a periphery of the first portion, wherein the third winding comprises a second pair of input terminals being coupled to the second pair of output pads on the second portion. The method may also include forming a first grounded plane positioned in the substrate between the second portion of the top surface and the first level and a second grounded plane positioned in the substrate between the first portion of the top surface and the second level, the first level and the second level being at most equal to the thickness. Embodiments of the subject technology are illustrated by examples shown below.

Figure 3:
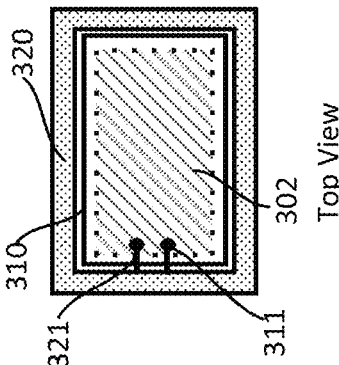
FIG. 3 is a schematic diagram of a power amplifier (PA) and an output matching network (OMN) transformer allocation in a front-end module PCB according to an embodiment of the subject technology.
Figure 3:
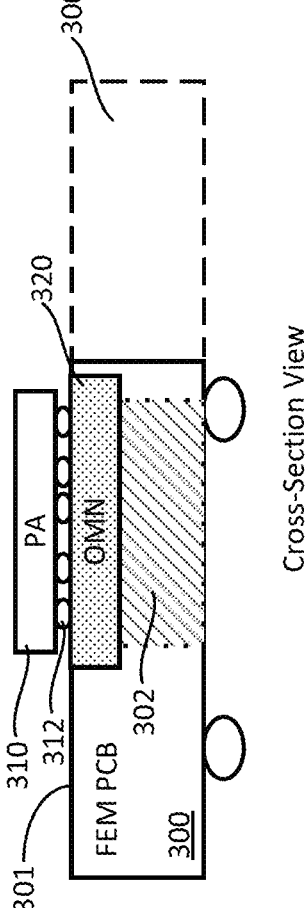

FIG. 3 is a schematic diagram of a power amplifier (PA) and an output matching network (OMN) transformer allocation in a front-end module PCB according to an embodiment of the subject technology. This diagram is merely an example, which should not unduly limit the scope of the claims. One of ordinary skill in the art would recognize many variations, alternatives, and modifications. In an embodiment, packaging of the power amplifier PA 310 and associated OMN 320 on the front-end module PCB 300 is arranged to provide a more compact front-end module than the conventional one shown in FIG. 2.

In the cross-section view of FIG. 3, the PCB 300 is provided with the OMN 320 being laid to be leveled with the top surface 301 and located under PA 310. The PA 310 is disposed on the top surface 301 of the PCB 300. With this location, a portion 300' of PCB 300 required to contain the OMN transformer in conventional manner can be eliminated, leading to direct reduction in package size of the front-end module.

In the top view of FIG. 3, it further illustrates that the OMN 320, in an embodiment, is provided as a PCB transformer configured to have a geometry of a looped shape with a central opening. The looped shape has a size bearing the periphery of the PA module such that the central free space of the PCB can be used for mounting a PA module. The central space is referred to a portion of the top surface of the PCB 300 as the PCB transformer 320 is either positioned in the top surface of the PCB or at a level below the top surface. FIG. 3 top view shows that PA 310 is mounted on the portion of the top surface of PCB 300. The entire region 302 below the portion of the top surface of PCB 300 can be fully utilized for forming all GND, I/O, and control lines for the PA 310 to couple with other functional blocks associated with the PCB including the OMN 320. Two output ports 311 of PA 310 can be coupled via two wires or conductive traces 321 to the OMN transformer 320 positioned in or below the top surface. Therefore, the proposed package of disposing PA inside a central free space of the PCB transformer effectively utilizes the PCB area to achieve package size reduction. Advantages also include that there is no need for additional materials or changes in OMN design which may cause higher loss of the output matching network for the same differential power amplifier design.

Figure 4:
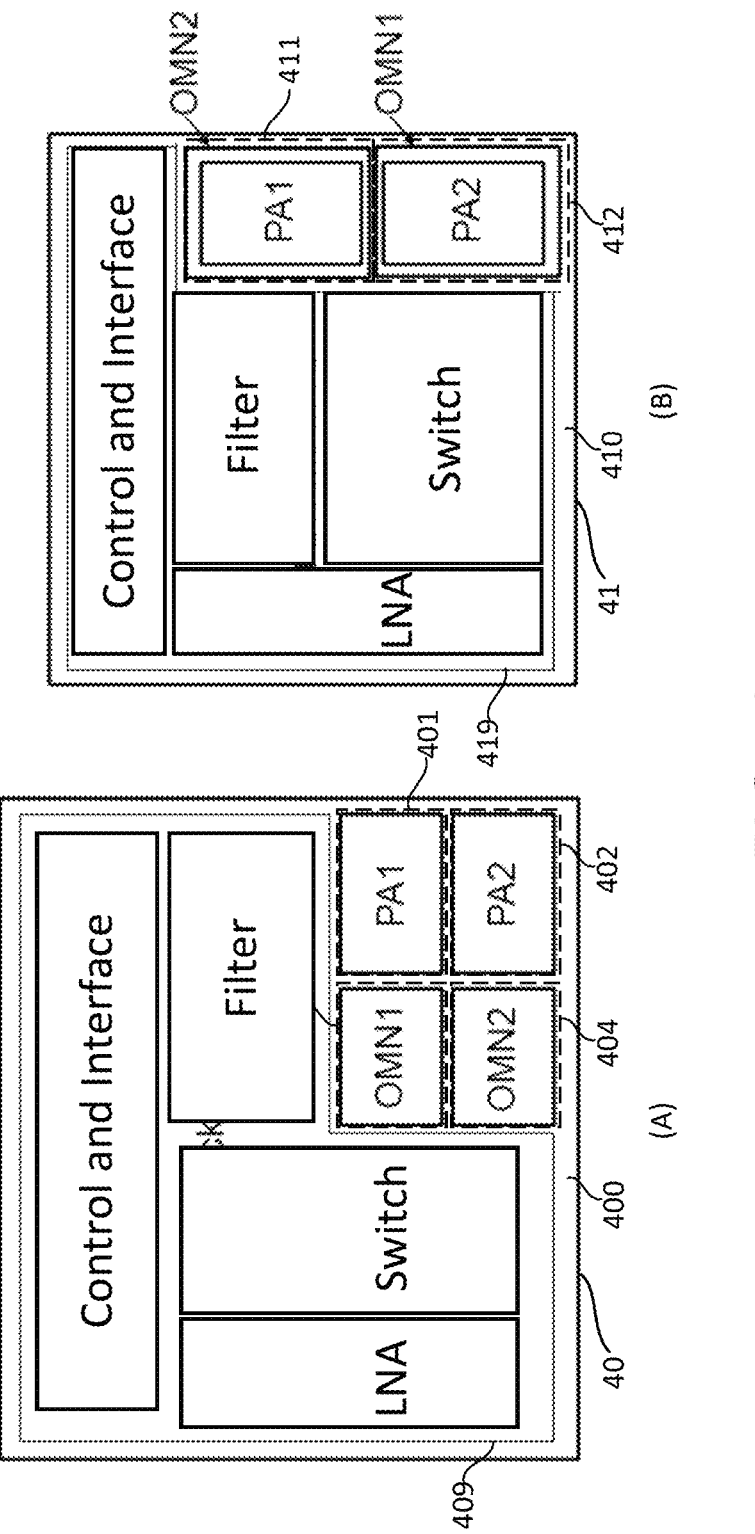
FIG. 4 is a schematic top view of a RF FEM module with two PAs and two OMNs in (A) a conventional PCB package and (B) a compact PCB package according to an embodiment of the subject technology.

FIG. 4 is a schematic top view of a RF FEM module with two PAs and two OMNs in (A) a conventional PCB package and (B) a compact PCB package according to an embodiment of the subject technology. This diagram is merely an example, which should not unduly limit the scope of the claims. One of ordinary skill in the art would recognize many variations, alternatives, and modifications. In an embodiment of the subject technology, an integrated circuit device is provided. As an example, the integrated circuit device is a Radio Frequency (RF) Front End Module (FEM) that combines various RF functional blocks into a compact module on a printed circuit board (PCB). RF FEM is commonly used in wireless communication systems, such as mobile devices, IoT devices, Wi-Fi routers, and other wireless transceiver applications. The RF FEM serves as an interface between the antenna and the transceiver, providing essential RF signal conditioning and processing. The RF FEM generally includes at least a power amplifier block which has a power amplifier (PA) and an associated output matching network (OMN). The PA is configured to boost the signal strength of the transmitted RF signal and provide the necessary power amplification to ensure that the transmitted signal can reach the desired range. The OMNs are utilized to ensure impedance matching between the RF FEM and the antenna or transmission line. These networks help maximize power transfer and minimize reflections between the FEM and the external components. In some modules, two or more PAs are needed to cover differential frequency bands. In many modules, PA generally employs differential structure to improve efficiency while generating higher output power. When use of differential structure, differential-to-single transformer OMN is needed.

Other functional blocks are needed in the RF FEM. For example, a low-noise amplifier (LNA) block is frequently integrated into the RF FEM to amplify weak incoming signals from the antenna before further processing. The LNA enhances the sensitivity and reception capability of the system by amplifying low-level signals with minimal additional noise. A filter block includes various filters to ensure proper frequency selectivity and rejection of unwanted signals. These filters can include bandpass filters, notch filters, or even duplexers to separate transmit and receive signals in full-duplex systems. A switch block includes various RF switches employed to control signal routing between different components or antenna ports. These switches enable seamless switching between transmit and receive modes, frequency bands, or antenna configurations. The RF FEM at least may incorporate a control and interface block with specific circuitry to facilitate communication and control between the FEM and the overall system. This circuitry can include digital interfaces, control logic, and voltage regulation components.

FIG. 4 part (A) shows a schematic block diagram of a radio frequency front-end module (RF FEM) 40 comprising two differential power amplifiers, PA1 and PA2, and two associated output matching networks, OMN1 and OMN2, in a conventional package on a PCB 400. For example, each OMN is a transformer prebuilt in the PCB by laying two windings of conductive traces in a non-conductive substrate. RF FEM 40 uses two power amplifiers for handing different frequency bands. Optionally, one PA is in ON state while another PA is in OFF state. Optionally, both PAs are in ON mode. By design, PA1 module takes portion 401 of the top surface area of the PCB 400. PA2 module takes portion 402 of the top surface area. Correspondingly, an output matching network OMN1 takes a similar sized portion 403 of the PCB adjacent to portion 401 where the PA1 module is mounted on and coupled to OMN1. Another OMN2 takes portion 403 of the PCB adjacent to portion 402 where the PA2 module is mounted on and coupled to OMN2.

Additionally, RF FEM 40, as a commonly used interface module between antenna and transceiver to provide RF signal conditioning and processing for wireless communication systems, also include multiple other functional blocks, such as a filter block, a switch block, a control and interface block, and a low-noise amplifier (LNA) block. All the other functional blocks are disposed on the remaining portion 409 of the top surface of PCB 400. Each of the other functional blocks can be individually packaged with advanced packaging methods such as system-in-package (SIP) and system-on-package (SOP) to make a corresponding optimized size. As they are integrated with the two PAs and two OMNs on the PCB 400, the FEM module size limit is reached such that the module performance degradation will be a tradeoff for further reducing the size of each functional block.

FIG. 4 part (B) shows a schematic block diagram of a RF FEM 41 with two amplifier blocks, i.e., a pair of PAs and associated OMNs, in a compact PCB 410 package according to an embodiment of the subject technology. As shown, each PA-OMN pair is packaged in a compact form such that it only takes one portion 411 or 412 of the top surface of PCB 410. This is achieved by disposing two PAs directly on the portions of PCB under which a corresponding OMN or another OMN has been pre-laid the PCB 410.

In one option, the PA1 is placed on the portion 411 of the top surface of PCB 410 where the OMN2 associated with PA2 is laid in the bulk region under the portion 411 while the PA2 is placed on the portion 412 of the top surface of PCB 410 where the OMN1 associated with the PA1 is laid in the bulk region under the portion 412. This option not only effectively utilizes the surface area and bulk space of the PCB 410 but also reduces electromagnetic coupling between the OMN and PA if the two amplifiers are alternatively in an on/off state, as the OMN does not locate directly under its associated PA.

In another option, the PA1 may be placed directly above its associated OMN1 and PA2 may be placed directly above the OMN2 if both amplifiers are in an ON state at the same time. In this option, the electromagnetic coupling between PA and its own OMN may be an issue of concern as each OMN has a looped shape that bears the periphery of the PA.

But the OMN1 and OMN2 may be respectively laid in the PCB 410 at a certain level below the top surface, as the increasing distance between the PA and its associated OMN will reduce the electromagnetic coupling. When both amplifiers are in an ON state at the same time, both options, 1) OMN1 under PA1 and OMN2 under PA2; 2) OMN1 under PA2 and OMN2 under PA1, are all possible. In this case, increasing distance between the PA and its OMN can reduce electromagnetic coupling. Alternatively, inserting a ground plane between PAs and OMNs may provide a sure reduction of electromagnetic coupling.

In some embodiments, the other functional blocks of the FEM 41, including at least a filter block, a switch block, a control and interface block, and a low-noise amplifier (LNA) block, can be packaged, as seen in FIG. 4 part (B), on the remaining portion 419 of the top surface of the PCB 410 outside the two portions 411 and 412 for the two power amplifier blocks. Even though each of the other functional blocks is its own optimum package like those in FIG. 4 part (A), the overall package size of the RF FEM 41 is reduced compared to the conventional package size of RF FEM 40.

In another embodiment, the RF FEM may include a duplexer configured to utilize one or more filters in the filter block and one or more switches in the switch block to separate a transmit signal and a receive signal and to direct the transmit signal and the receive signal to appropriate paths, the transmit signal being based on one of the first single voltage output and the second single voltage output, a receive signal being based on an output from the low-noise amplifier block. In some embodiments, the duplexer is included in the power amplifier block to serve as a power amplifier duplexer (PAD) in some FEM modules. For wireless mobile communication, RF PAD had been employed in the handheld devices. 5G and beyond systems such as 6G will require a much smaller form factor of the RF FEM. For various wireless communication applications, PAD needs multiple PA blocks to cover various signal bands. When there are even numbers of PAs, two PAs for example, coupling problem between PA and its OMN can be solved much easier using the proposed method of packaging shown in FIG. 4 part (B) and more details in FIG. 5 below. At the same time, the proposed method of packaging also leads to a reduced module size.

Figure 5:
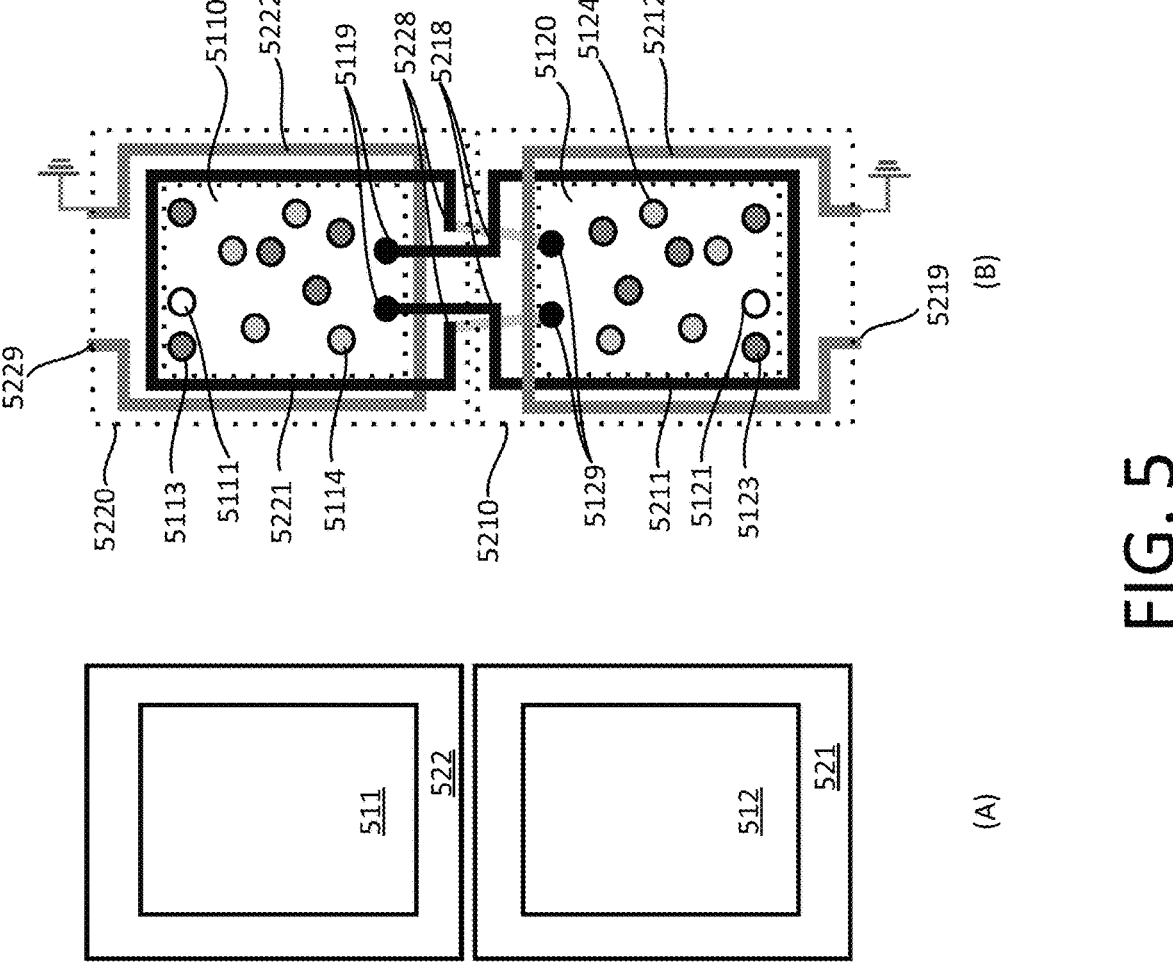
FIG. 5 is a top view of (A) a schematic diagram of two PAs and two OMNs and (B) a layout of contact pads for the two PAs and windings of the two OMN transformers in a compact PCB package according to an embodiment of the subject technology.

FIG. 5 is a top view of (A) a schematic diagram of two PAs and two OMNs and (B) a layout of contact pads for the two PAs and windings of the two OMN transformers in a compact PCB package according to an embodiment of the subject technology. This diagram is merely an example, which should not unduly limit the scope of the claims. One of ordinary skill in the art would recognize many variations, alternatives, and modifications. FIG. 5 part (A) shows an example of a compact package of two PAs (511 and 512) and two OMNs (521 and 522) in a FEM or simply a PAD module. Each OMN (e.g., 521) is laid in a printed circuit board (PCB) directly under another PA (512) instead of its own PA (511). In fact, OMN 522 is under PA 511. PA 511 is disposed adjacent to the PA 512. In an alternative viewpoint for this configuration, each OMN (e.g., 521) is configured in a geometry with a looped shape that bears a periphery of another PA (512) so that a central portion of the looped shape of the PCB can be used to support the PA (512).

In an embodiment, as shown in FIG. 5 part (B), each OMN is provided as a PCB transformer with a primary winding of conductive traces and a secondary winding of conductive traces formed at a certain level below the top surface. The level may be zero, i.e., the same level as the top surface. The level may be deeper in the bulk of PCB. The level at most may be the thickness of the PCB (or the same level as the bottom surface). A first transformer, corresponding to OMN 521, includes a first (primary) winding 5211 of conductive wires or traces inside PCB and a second (secondary) winding 5212 of conductive wires or traces in the PCB. Both the primary and secondary windings are geometrically overlapped with each other. A second transformer, corresponding to OMN 522, includes a third winding 5221 and a fourth winding 5222 in a similar configuration laid in the PCB. The first transformer is disposed in a first OMN area 5210 of the PCB. The second transformer is disposed in a second OMN area 5220 adjacent to the first OMN area 5210. The primary (first) winding 5211 of the first transformer has a first pair of input terminals 5218 configured to couple to a first differential voltage output from a first PA 511 that is supposed to be disposed in a first PA area 5110 within the central portion of the second OMN area 5220. The secondary (second) winding 5212 of the first transformer has a grounded terminal and a first output terminal 5219 configured to provide a first single voltage output. The primary (third) winding 5221 of the second transformer has a second pair of input terminals 5228 configured to couple to a second differential voltage output from a second PA 512 that is supposed to be disposed in second PA area 5120 within the central portion of the first OMN area 5210. The secondary (fourth) winding 5222 of the second transformer has a grounded terminal and a second output terminal 5229 configured to provide a second single voltage output.

In a specific embodiment, each winding in each transformer is configured to a coil loop with an outer periphery at a boundary of allocated OMN area (e.g., 5210) and an inner periphery at a boundary of allocated PA area (e.g., 5120). The first PA area 5110 is a portion of PCB top surface on which the first PA 511 can be disposed. Various contact pads including at least a first pair of output pads 5119, a first input pad 5111, multiple first control pads 5114, and multiple first grounding (GDN) pads 5113 are formed on the portion of PCB top surface within the first PA area 5110 for coupling with the to-be-disposed (first) PA module. The first pair of output pads 5119 is configured to couple to the first pair of input terminals 5218 of the primary (first) winding 5211 of the first transformer. The second PA area 5120 is a portion of PCB top surface on which the second PA can be disposed. Various contact pads including at least a second pair of output pads 5129, a second input pad 5121, multiple second control pads 5124, and multiple second grounding (GDN) pads 5123 are formed on the portion of PCB top surface within the second PA area 5120 for coupling with the to-be-disposed (second) PA module. The second pair of output pads 5129 is configured to couple to the second pair of input terminals 5228 of the primary (third) winding 5221 of the second transformer.

The compact package configuration and corresponding PA-OMN layout illustrated in FIG. 4 can be expanded to FEM or PAD modules with any even numbers of power amplifier blocks. Each pair of PA blocks can be configured the same way as the first and second PA blocks in FIG. 4. For FEMs or PADs in an operation mode with one PA1 being ON and another PA2 being OFF, the proposed layout according to the subject technology not only leads to a compact module size but also maintain low electromagnetic coupling as each OMN transformer is not located directly under but at a side of its own PA. When the FEM or PAD operates in a mode using both PAs at the same time, the electromagnetic coupling can be reduced by increasing the distance between the OMNs and the PAs. This may be achieved by positioning windings of conductive traces of the OMNs to the bottom surface of the PCB. Optionally, a grounded plane may be laid in the PCB between the top surface and the windings of the OMNs.

Figure 6:
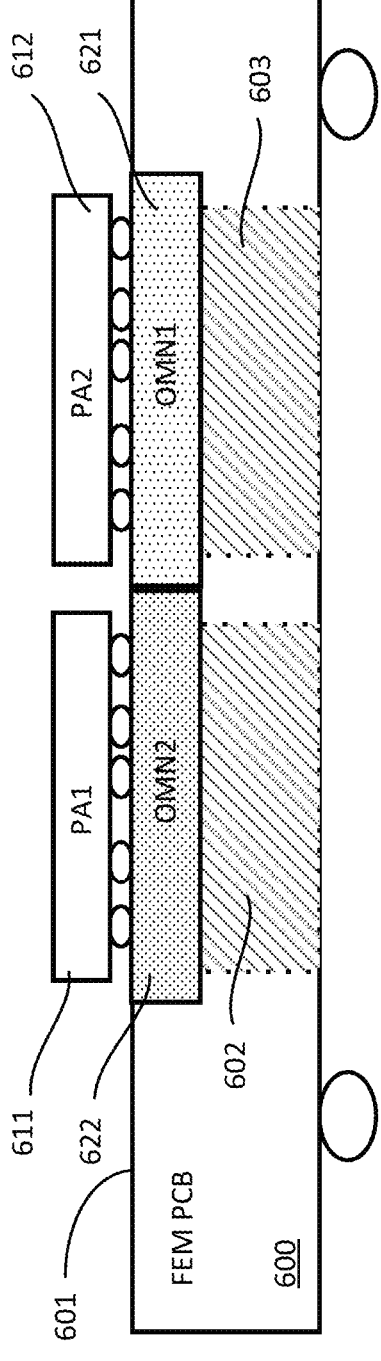
FIG. 6 is a cross-section view of two PAs and two OMNs in a compact FEM PCB package according to the embodiment of the subject technology.

FIG. 6 is a cross-section view of two PAs and two OMNs in a compact FEM PCB package according to the embodiment of the subject technology. This diagram is merely an example, which should not unduly limit the scope of the claims. One of ordinary skill in the art would recognize many variations, alternatives, and modifications. FIG. 6 is a cross-section view of two PAs and two associated OMNs in a compact PCB package for a front-end module (FEM) shown in FIG. 5. The first PA 611 and the second PA 612 are disposed on top surface 601 of a FEM PCB 600, which is a single printed circuit board designed for mounting all functional blocks of the front-end module) using a flip-chip packaging approach. Various contact pads including at least a ground (GND), input/output, control line pads being formed underneath the corresponding PA module (die). The first OMN 621 is associated with the first PA 611. It includes bunch of conductive traces laid in the FEM PCB 600 with a relative location under the second PA 612. The second OMN 622 is associated with the second PA 612. It includes bunch of conductive traces laid in the FEM PCB 600 with a relative location under the first PA 611. Additionally, a bulk region 602 of PCB 600 below the portion of top surface 601 under the first PA 611 (optionally through the entire thickness of the PCB) is utilized to build all GND, IO, and control lines that are employed to couple the corresponding PA 611 to the system. Similarly, a bulk region 603 of PCB 600 below the portion of top surface 601 under the second PA 612 is utilized to build all GND, IO, and control lines that are employed to couple the corresponding PA 612 to the system.

Figure 7:
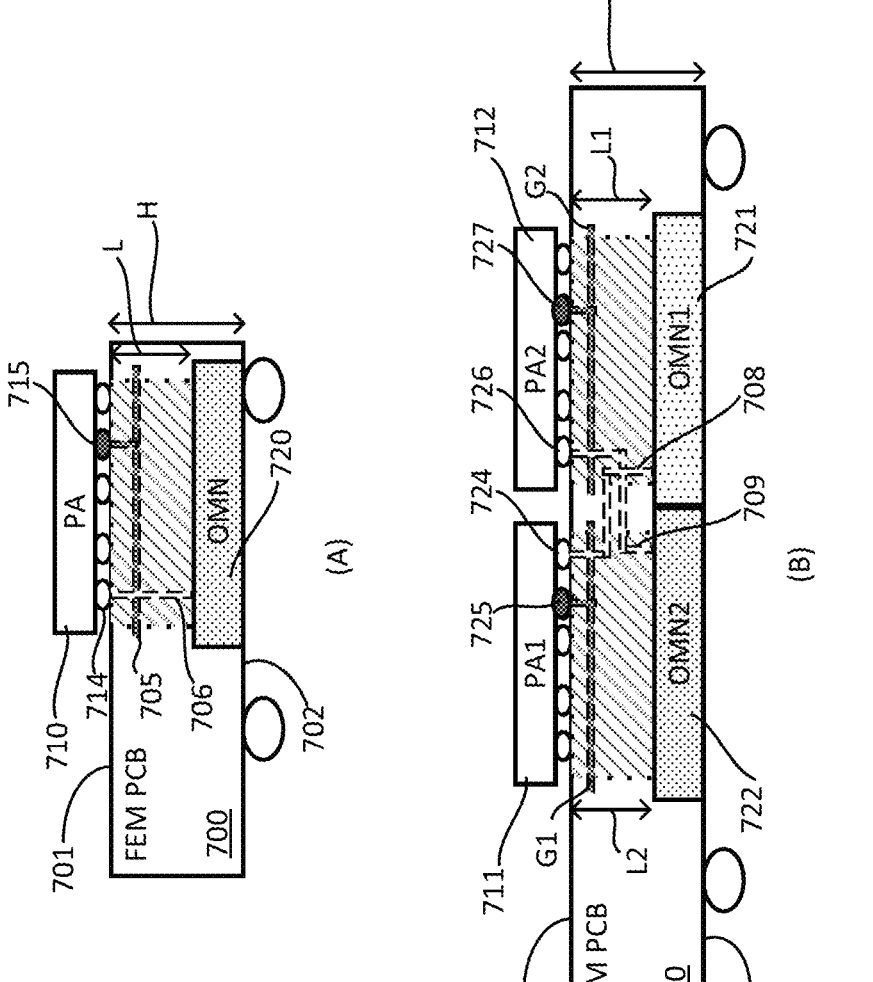
FIG. 7 is a cross-section view of (A) one PA and one OMN and (B) two PAs and two OMNs in a compact FEM PCB package according to some embodiments of the subject technology.

FIG. 7 is a cross-section view of (A) one PA and one OMN and (B) two PAs and two OMNs in a compact FEM PCB package according to some embodiments of the subject technology. This diagram is merely an example, which should not unduly limit the scope of the claims. One of ordinary skill in the art would recognize many variations, alternatives, and modifications. FIG. 7 part (A) shows that in a compact FEM PCB package, a OMN 720 (windings of conductive traces) is pre-laid in the FEM PCB at a level L below top surface 701 that supports an associated power amplifier (PA) 710. The PA 710 is mounted on top surface 701 via multiple contact pads formed in the top surface 701. The multiple contact pads include at least a grounding pad 715 and an output pad 714 coupled to the OMN 720 via an interconnect 706. This package, comparing to that shown in FIG. 3, has an increased distance between the OMN 720 and the PA 710 so that the electromagnetic interference coupling between them can be reduced or eliminated. The level L may equal to zero, i.e., the OMN 720 is actually leveled with the top surface 701. The level L may equal to H, i.e., the thickness of the FEM PCB 700, such as the OMN 720 is laid to be leveled with the bottom surface 702 of the FEM PCB 700. The schematic drawing in FIG. 7 (part A) is not in scale as true dimension of the OMN 720. In general, level L geometrically is allowed to vary between zero and the thickness of PCB 700. In an alternative embodiment, a grounded plane 705 may be inserted between the PA 710 and OMN 720 to provide electromagnetic shielding. Optionally, the grounded plane 705 may be a bunch of metal lines or a net of conductive traces that has a grounding connection. The grounded plane 705 may be a metallized plane formed in the PCB 700 and coupled to the grounding pad 715.

FIG. 7 part (B) further shows a compact FEM PCB package with two PAs and two associated OMNs. The first PA 711 is mounted on the top surface 703 of PCB 770 via multiple contact pads including at least a grounding pad 725 and an output pad 724. The second PA 712 is also mounted on the top surface 703 adjacent to the first PA 711 via multiple contact pads including at least a grounding pad 727 and an output pad 726. The first OMN 721, which is associated with the first PA 711, may be laid in the PCB 770 at a first level L1 below the top surface 703 under the second PA 712. The second OMN 722, which is associated with the second PA 712, may be laid in the PCB 770 at a second level L2 below the top surface 703 under the first PA 711. The first level L1 may be selected from 0 to the thickness H of PCB 770. Similarly, the second level L2 may be any value between 0 and H. L2 may not be equal to L1. Optionally, the two OMNs are laid in a position that is leveled with the bottom surface 704 of PCB 770 to have a maximum distance H between the PAs and associated OMNs.

The first OMN 721 is coupled via an interconnect 708 (wire or conductive trace line) formed inside the PCB 770 to the output pad 724 of the first PA 711. The second OMN 722 is coupled via an interconnect 709 (wire or conductive trace line) formed inside the PCB 770 to the output pad 726 of the second PA 712. In an embodiment, increasing values of L1 and L2 helps to reduce electromagnetic coupling between the power amplifier and its output matching network.

In another embodiment, a first grounded plane G1 can be disposed between a first portion of the top surface 703 under the first PA 711 and the second OMN 722 to serve as an electromagnetic shield. The first grounded plane G1 is coupled to the grounding pad 725 in the first portion of top surface 703 under the first PA 711. A second grounded may also be disposed between a second portion of top surface 703 under the second PA 912 and the first OMN 721 to serve as an electromagnetic shield. The second grounded plane G2 is coupled to the ground pad 727 in the second portion of top surface 703 under the second PA 712. These electromagnetic shields can substantially reduce the coupling between each PA and its associated OMN. Even if the OMN is disposed directly under its own PA and both PAs are operating at the same time, these electromagnetic shields can ensure no coupling effect between PAs and OMNs in any working bands of the RF FEM compact module.

In another embodiment, the subject technology provides a method for processing an integrated circuit device. The method includes providing a printed circuit board (PCB) comprising a top surface and a thickness, the top surface comprising a least a first portion and a second portion, the second portion being adjacent to the first portion. The PCB is processed to lay out all kinds of conductive traces for control lines, grounding connections, input/output lines, etc. The method may include laying out a first winding of conductive traces and a second winding conductive traces in the PCB at a first level below the second portion of the top surface. In particular, the first winding of conductive traces is overlapped with the second winding of conductive traces. In an embodiment, the process of laying out the first winding and the second winding includes making them in a looped shape bearing a periphery of the second portion defined on the top surface of the PCB. The first winding of conductive traces includes a first pair of input terminals. The second winding of conductive trances may include a first grounding terminal and a first output terminal.

Additionally, the method of processing the integrated circuit device includes laying out a third winding of conductive traces and a fourth winding conductive traces in the PCB at a second level below the first portion of the top surface. The third winding of conductive traces is overlapped with the fourth winding of conductive traces. The method further includes making the third winding and the fourth winding in a looped shape bearing a periphery of the first portion defined on the top surface of the PCB. The third winding of conductive traces includes a second pair of input terminals. The fourth winding of conductive trances may include a second grounding terminal and a second output terminal. The method may also include forming a first transformer based on the first winding and the second winding positioned directly at the first level below the second portion of the PCB. The method may also include forming a second transformer based on the third winding and the fourth winding positioned directly at the first level below the second portion of the PCB.

Furthermore, the method of processing the integrated circuit device includes forming multiple first contact pads on the first portion of the top surface, the multiple first contact pads comprising at least a first pair of output pads and a first grounding pad. The first pair of output pads are coupled to the first pair of input terminals of the first winding, the primary winding, of the first transformer. The first grounding pad is coupled to the first grounding terminal of the second winding, the secondary winding, of the first transformer. The method of processing the integrated circuit device also includes forming multiple second contact pads on the second portion of the top surface, the multiple second contact pads comprising at least a second pair of output pads and a second grounding pad. The second pair of output pads are coupled to the second pair of input terminals of the third winding, the primary winding, of the second transformer. The second grounding pad is coupled to the second grounding terminal of the fourth winding, the secondary winding, of the second transformer.

Moreover, the method of processing the integrated circuit device includes disposing a first amplifier module onto the first portion of the top surface, the first pair of output pads being configured to couple a first differential output from the first amplifier module to the first transformer under the second portion of the top surface. The method also includes disposing a second amplifier module onto the second portion of the top surface, the second pair of output pads being configured to couple a second differential output from the second amplifier module to the second transformer under the first portion of the top surface. In another embodiment, the method of processing the integrated circuit device where processing the PCB may include forming a first grounded plane positioned between the second portion of the top surface and the first level and forming a second grounded plane positioned between the first portion of the top surface and the second level, the first level and the second level being at most equal to the thickness.

While the above is a full description of the specific embodiments, various modifications, alternative constructions and equivalents may be used. Therefore, the above description and illustrations should not be taken as limiting the scope of the subject technology which is defined by the appended claims.

What is claimed is:

1. An integrated circuit device comprising:
   a substrate comprising a top surface, the top surface comprising a first portion, a second portion, a third portion, and a fourth portion, the second portion at least partially surrounding periphery of the first portion, the fourth portion being adjacent to the second portion and partially surrounding a periphery of the third portion, and remaining portion outside the first portion and the second portion, the substrate comprising at least two windings of conductive traces positioned at a level below the second portion;
   a first circuit disposed on the first portion, the first circuit comprising at least a first amplifier;
   a second amplifier coupled to the third portion;
   a second circuit comprising a first transformer and a second transformer based on the two windings of conductive traces, the first transformer being coupled to the first amplifier, the second transformer being coupled to the second amplifier; and
   a third circuit disposed on the remaining portion of the substrate.

2. The integrated circuit device of claim 1, wherein the first portion comprises a plurality of contact pads coupled to the first amplifier, the plurality of contact pads including at least a pair of output pads, an input pad, multiple grounding pads, and multiple control pads.

3. The integrated circuit device of claim 2, wherein the first transformer based on the two windings comprise a first winding and a second winding, the first winding comprising a first pair of terminals coupled to the pair of output pads to receive a differential voltage output from the first amplifier, the second winding comprising a ground terminal and an output terminal configured to provide a single voltage output.

4. The integrated circuit device of claim 3, wherein the first circuit comprises a power amplifier duplexer coupled to the second circuit and the third circuit to separate a transmit signal based on the single voltage output from the first transformer and a receive signal based on an output from the third circuit.

5. The integrated circuit device of claim 1, wherein the first winding and the second winding are overlapped with each other.

6. The integrated circuit device of claim 1, wherein the level below the second portion varies between zero and a thickness of the substrate.

7. The integrated circuit device of claim 1, wherein the substrate comprises a grounding plane positioned between the first portion of the top surface and the two windings of conductive traces.

8. An integrated circuit device comprising:
   a substrate comprising a top surface, the top surface comprising a first portion, a second portion, a third portion, and a fourth portion, the second portion at least partially surrounding periphery of the first portion, the fourth portion at least partially surrounding periphery of the third portion, the second portion being adjacent to the fourth portion, the substrate comprising a first pair of windings of conductive traces positioned at a first level below the fourth portion and a second pair of windings of conductive traces positioned at a second level below the second portion;
   a first amplifier coupled onto the first portion;
   a second amplifier coupled onto the third portion;
   a first transformer based on the first pair of windings and being coupled to the first amplifier; and
   a second transformer based on the second pair of windings and being coupled to the second amplifier.

9. The integrated circuit device of claim 8, wherein the first portion comprises at least a first pair of output pads configured to couple to the first amplifier.

10. The integrated circuit device of claim 9, wherein the first transformer based on the first pair of windings comprises a first winding and a second winding, the first winding overlapped with the second winding, the first winding comprising a first pair of terminals configured to couple to the first pair of output pads to receive a first differential voltage output from the first amplifier, the second winding comprising a first grounded terminal and a first output terminal configured to provide a first single voltage output.

11. The integrated circuit device of claim 8, wherein the third portion comprises at least a second pair of output pads configured to couple to the second amplifier.

12. The integrated circuit device of claim 11, wherein the second transformer based on the second pair of windings comprises a third winding and a fourth winding, the third winding overlapped with the fourth winding, the third winding comprising a second pair of terminals configured to couple to the second pair of output pads to receive a second differential voltage output from the second amplifier, the fourth winding comprising a second grounded terminal and a second output terminal configured to provide a second single voltage output.

13. The integrated circuit device of claim 8, wherein the first level below the second portion varies between zero and a thickness of the substrate.

14. The integrated circuit device of claim 13, wherein the substrate comprises a first grounded plane positioned vertically between the top surface and the first transformer, the first grounded plane being extended laterally across both the third portion and the fourth portion.

15. The integrated circuit device of claim 8, wherein the second level below the fourth portion varies between zero and a thickness of the substrate.

16. The integrated circuit device of claim 15, wherein the substrate comprises a second grounded plane positioned vertically between the top surface and the second transformer, the second grounded plane being extended laterally across both the first portion and the second portion.

17. A method for processing an integrated circuit device, the method comprising:

provisioning a substrate comprising a top surface and a thickness, the top surface comprising a least a first portion and a second portion, the second portion being adjacent to the first portion;

laying out a first winding of conductive traces and a second winding conductive traces in the substrate at a first level below the second portion of the top surface, the first winding of conductive traces being overlapped with the second winding of conductive traces;

laying out a third winding of conductive traces and a fourth winding conductive traces in the substrate at a second level below the first portion of the top surface, the third winding of conductive traces being overlapped with the fourth winding of conductive traces;

forming multiple first contact pads on the first portion of the top surface, the multiple first contact pads comprising at least a first pair of output pads coupled to the first winding;

forming multiple second contact pads on the second portion of the top surface, the multiple second contact pads comprising at least a second pair of output pads coupled to the third winding;

disposing a first amplifier onto the first portion of the top surface, the first pair of output pads being coupled to a first differential output from the first amplifier; and disposing a second amplifier onto the second portion of the top surface, the second pair of output pads being coupled to a second differential output from the second amplifier.

18. The method of claim 17, comprising forming a first transformer based on the first winding of conductive traces and the second winding conductive traces in an at-least-partially-looped shape bearing a periphery of the second portion, wherein the first winding comprises a first pair of input terminals being coupled to the first pair of output pads on the first portion.

19. The method of claim 17, comprising forming a second transformer based on the third winding and the fourth winding in an at-least-partially-looped shape bearing a periphery of the first portion, wherein the third winding comprises a second pair of input terminals being coupled to the second pair of output pads on the second portion.

20. The method of claim 17, comprising forming a first grounded plane positioned in the substrate between the second portion of the top surface and the first level and a second grounded plane positioned in the substrate between the first portion of the top surface and the second level, the first level and the second level being at most equal to the thickness.

* * * * *